United States Patent [19]

Fedele et al.

[11] Patent Number: 4,831,439

[45] Date of Patent: May 16, 1989

[54] REFRESH SYSTEM FOR DIGITAL SIGNALS WITH REFRESH CYCLE SYNCHRONIZATION

[75] Inventors: Nicola J. Fedele, Kingston, N.J.; Alfonse A. Acampora, Staten Island, N.Y.; Richard M. Bunting, Robbinsville, N.J.; Harvey Waldman, Yardley, Pa.

[73] Assignee: General Electric Company, Schenectady, N.Y.

[21] Appl. No.: 194,671

[22] Filed: May 16, 1988

[51] Int. Cl.$^4$ .............................................. H04N 7/137
[52] U.S. Cl. .................................... 358/133; 358/136; 375/27
[58] Field of Search ................... 358/133, 135, 136; 375/27

[56] References Cited

U.S. PATENT DOCUMENTS

| | | | |
|---|---|---|---|
| 3,940,563 | 2/1976 | Susset | 375/116 |
| 4,045,613 | 8/1977 | Walker | 375/112 |
| 4,054,754 | 10/1977 | Nicodemus et al. | 375/112 |
| 4,353,129 | 10/1982 | Nishiwaki | 375/112 |
| 4,420,771 | 12/1983 | Pirsch | 358/133 |
| 4,453,260 | 6/1984 | Inagawa et al. | 375/116 |
| 4,613,979 | 9/1986 | Kent | 375/108 |
| 4,641,326 | 2/1987 | Tomisawa | 375/108 |
| 4,646,329 | 2/1987 | Bojarski | 375/116 |
| 4,674,088 | 6/1987 | Grover | 375/116 |
| 4,686,690 | 8/1987 | Sato | 375/116 |
| 4,706,260 | 11/1987 | Fedele | 358/133 |
| 4,774,496 | 9/1988 | Tomasevich | 375/27 |

Primary Examiner—Howard W. Britton
Attorney, Agent, or Firm—William Squire; James C. Davis, Jr.; Paul R. Webb, II

[57] ABSTRACT

In a DPCM video digital data communication system, each scan line of a video frame is refreshed with PCM data over a refresh cycle comprising a plurality of frames. Refresh generators at the transmitter and at the receiver are synchronized with an initialization signal and with subsequent refresh cycle synchronizing signals. Also the scan lines and frames are synchronized with corresponding transmitted marker synchronizing signals. The refresh generators run asynchronously between marker synchronizing signals to select scan lines for refresh. The refresh generators each employ counters for counting a selected number M which is an integer having no factors in common with the number of scan lines of a frame to select scan lines for refresh which have different spatial positions in adjacent successive frames to avoid generating visible refresh artifacts.

18 Claims, 6 Drawing Sheets

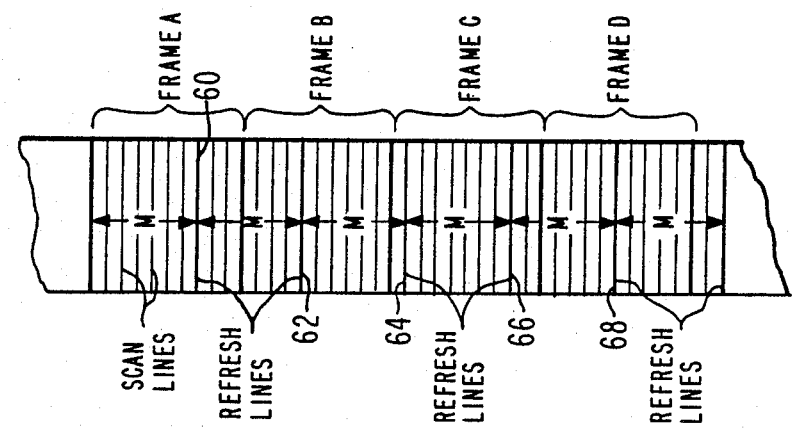
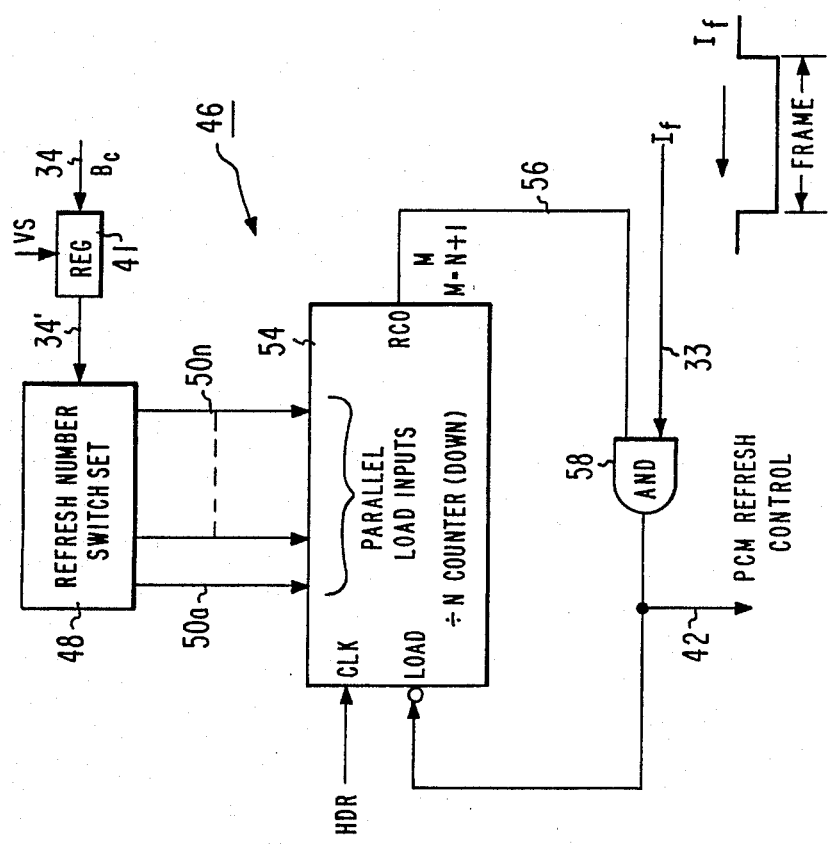
Fig. 4
Fig. 3a

REFRESH SYSTEM FOR DIGITAL SIGNALS WITH REFRESH CYCLE SYNCHRONIZATION

This invention relates to a system for refreshing a digital signal of a video communication system, and in particular, to resynchronizing the refreshing of data in a receiver.

U.S. Pat. No. 4,706,260 entitled "A DPCM System with Rate-of-Fill Control of Buffer Occupancy" in the name of Fedele et al. is incorporated by reference herein. Of interest are copending applications Ser. No. 63,040 filed June 17, 1987 entitled "Parameterized Variable-length Coding" in the name of B. Astle and S. J. Golin abandoned in favor of CIP appliction Ser. No. 175,915 filed 03/31/88 (and assigned to Intel Corp.) Ser. No. 127,335 filed 12/1/87 entitled "DPCM System with Adaptive Quantizer Having Unchanging Bin Number Ensemble" in the name of A. A. Acampora; Ser. No. 130,379 filed 12/8/87 entitled "Modified Statistical Encoder" in the name of N. J. Fedele; Ser. No. 158,171 filed 02/01/88 entitled "Decoder for Digital Signal Codes" in the name of Hingorani et al. abandoned in favor of continuation application Ser. No. 237,631 filed Aug. 26, 1988; Ser. No. 194,657 filed concurrently herewith entitled "Error Detector for Encoded Digital Signals" in the name of N. J. Fedele and Ser. No. 194,656 filed concurrently herewith in the name of Acampora et al. entitled "Refresh System for Digital Signals" all assigned to General Electric Company, Ser. No. 008,695 filed 1/30/87 entitled "Block Oriented Random Access Memory Able to Perform a Data Read, a Data Write and a Data Refresh Operation in One Block-access Time" in the name of T. J. Christopher assigned to GE/RCA Licensing Management Operation and Ser. No. 121,025 filed 11/16/87 entitled "Memory Controller As For a Video Signal Processor" in the name of D. L. Sprague et al. assigned to Technology, Inc. 64, the latter two each being a subsidiary of General Electric Co.

In certain cases where the bandwidth available in a transmission channel is limited, it is desirable to compress to as large an extent as possible video data to be transmitted. Numerous schemes have evolved for increasing the efficiency of such compression during transmission while not introducing too intrusive reduction in image quality. For example; one kind of system known as differential pulse code modulation (DPCM) employs a predictive scheme for predicting pixel values of a video picture. The predicted information is compared to the actual information based on spatial or temporal relationships, and an error signal is generated representing the differences between the two information signals. The error signals are further reduced in information content by more coarsely quantizing them—that is, reducing a set of signal values to a smaller set by assigning a given bin value to a range of values of the larger set. The coarsely quantized signal is then encoded using codewords of variable bit length based on statistical parameters. This procedure is known as statistical coding.

Huffman has described procedures for describing variable length codes optimally. Further improvements in coding efficiency can be obtained by treating certain runs of successive bin values that are all alike differently from other bin values. Runs of certain length and value that are likely to occur can be classified as special cases and included in the statistical coding procedure, to be accorded short bit length codewords reflective of their tendency to frequently occur. Signals having large run lengths may be converted to relatively short codewords which drastically increase the efficiency of the transmission system.

At the receiver, the coded error signal is decoded and summed with a predicted signal formed from prior decoded error signals in what is referred to as the inverse DPCM loop. The receiver reconstitutes the coded signal with an inverse process. The predictor delay circuit in the inverse DPCM loop stores a prior received decoded signal to be summed to the current received decoded error signal to create the next prediction.

In digital communication systems, for example a DPCM system, the problem recognized by the invention disclosed in copending application entitled "Refresh System for Digital Signals" is one in which interference such as atmospheric conditions or other causes, occasionally cause the transmitted information signal to become garbled or lost. If such loss of data occurs in transmission, the predictor delay circuit of the inverse DPCM loop also loses that data. What happens is that this loop adds the current predicted signal to the current error signal to produce a reconstituted signal or new prediction. If the current error signal is lost, or corrupted, then that signal when summed with the signal in the predictor delay circuit can produce an erroneous reconstituted signal which is applied to the predictor delay circuit to bootstrap the error on a continuous basis. The data signals within the inverse DPCM loop at the receive thus become corrupted. The inventors in that above-mentioned copending application Ser. No. 194,656 recognize a need for dealing with the problem of lost data in a DPCM system by recovering the data at the receiver in real time without significant observable recurrent video artifacts.

However, an assumption is made therein that once the receiver is initially synchronized to the transmitter with the first frame, the refresh system in the receiver, which is asynchronously operated, will automatically maintain synchronization based on the locally generated horizontal drive sync signal. The present inventors recognize that should one or more frames be lost in a variable length codeword transmission system, the compression of data can also cause shifts in frame timing. Thus, even where the receiver and transmitter are initially synchronized, loss of data during transmission can also cause possible loss of synchronization of the receiver refresh system to line and frame cycles.

This problem is resolved in a DPCM system in accordance with the present invention which includes a transmitter for transmitting a plurality of frames of a compressed digital encoded information signal over a channel to a receiver. The transmitter includes a DPCM loop which produces an error signal representing the differences between a predicted signal and a current PCM signal having the same spatial position in a successive frame. Each frame comprises a plurality of S lines. The receiver includes an inverse DPCM loop for adding a current predicted signal, formed from a prior decoded error information signal, to a current decoded error information signal to produce a reconstituted signal. The signal in the inverse DPCM loop tends to become corrupted upon loss of the current decoded error information signal. Refresh means at the transmitter and receiver each periodically refresh the same selected ones of the lines in a given sequence with PCM data for a plurality of frames over a plurality of refresh cycles wherein in each cycle each scan line of a frame is refreshed. Means periodically synchronize the refresh means at the receiver with the refresh means at the transmitter for selected refresh cycles.

In the drawing:

FIGS. 3a and 3b are block diagrams of the respective transmitter and receiver refresh generators of the embodiment of FIG. 2;

FIG. 4 is a schematic representation of a display useful for explaining certain principles;

Figure 1:
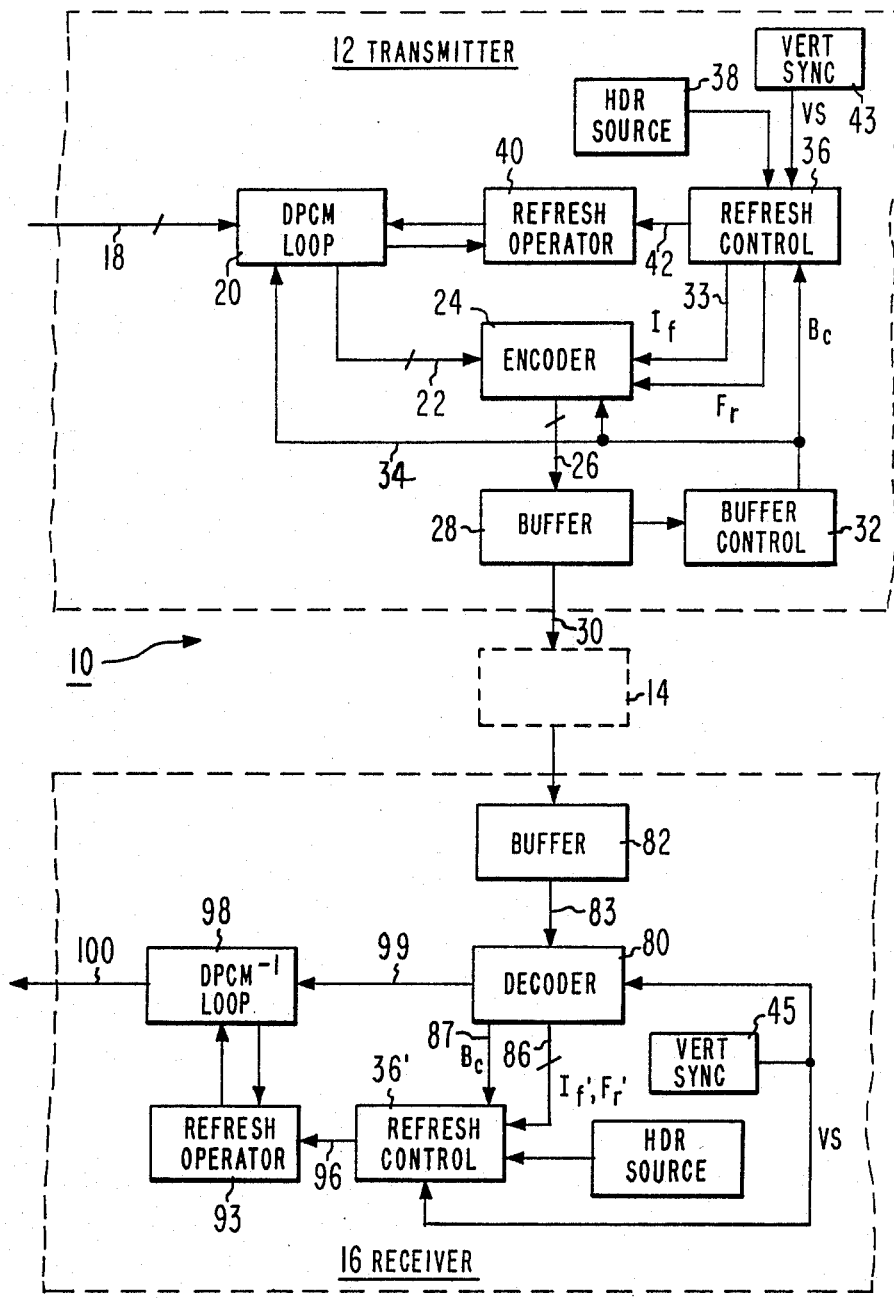
FIG. 1 is a block diagram of a DPCM transmission system employing a refresh system according to one embodiment of the present invention.

In FIG. 1, system 10 comprises a transmitter 12, a channel 14 over which the transmitter 12 transmits and a receiver 16. By way of example, the transmitter 12 and receiver 16 are described as a predictive picture encoder employing differential pulse code modulation (DPCM). However, the signals refreshed by the refresh system of the present invention may be derived from sources other than error signals in a predictive system.

A source of an information signal (not shown), for example, a video signal, applies the information signal to an analog-to-digital converter (ADC) (not shown) which finely quantizes the information signal in a known way to produce a multilevel digital signal. The output of the analog-to-digital converter (ADC) is applied on conductor 18 as an 8 bit pixel signal to a differential pulse code modulator (DPCM) loop 20. The DPCM loop 20 is one that is generally available and well known. It includes, for example in FIG. 2, subtractor S for subtracting predicted information signals produced by a predictor and delay loop PD from the finely quantized information signal on conductor 18 to produce an error signal on conductor 19. The output of loop PD is applied to subtractor S through switch S1 whose purpose will be explained later. That error signal is applied to a quantizer Q which assigns different values of the input error signal to a reduced number of output values or bins representing zero and non-zero values of the error signal. By way of example, the quantizer Q may have 32 bin values and a zero value, i.e., 32 non-zero values, for a total of 33 different values. The quantizer output values are applied to adder A via DPCM output conductor 22. The conductor 22 is also connected to conductor 19 via switch S2 which selectively bypasses quantizer Q as will also be explained later. Switch S1 connects loop PD to conductor 44 in one switch position when switch S2 is open. Switch S1 applies a reference potential to conductor 44 and subtractor S in a second switch position when switch S2 is closed. Adder A adds the quantizer Q output signals to the predictor and delay loop PD output (via switch S1) and applies the added signals to the predictor and delay loop PD.

Such a DPCM loop may be, for example, except for switches S1 and S2, as described in U.S. Pat. No. 4,706,260 and in several of the aforementioned copending applications, which describe prior art DPCM loops in greater detail.

It should be understood that wires representing conductors herein represent either single conductors or multiple conductors for transmitting data signals in parallel as known. The input information signal on conductor 18 to DPCM loop 20 may comprise, for example, an 8 conductor cable for carrying an 8 bit signal.

In FIG. 1, the output of the DPCM loop 20 is applied to conductor 22 and may be an 8 bit signal which represents any of the 33 quantized zero and non-zero values of the information signal. The output of the DPCM loop 20 on conductor 22 is applied to encoder 24.

The encoder 24 encodes the output values of loop 20 to generate variable length codewords on conductor 26. The codewords are applied to a buffer 28 sometimes referred to as a rate buffer. The buffer 28 stores the codes for transmission over channel 14 via conductor 30. As known, the buffer 28 tends to overfill and underfill in response to the variable length codewords applied as an input thereto on conductor 26 and has a fixed output rate on conductor 30.

A buffer control 32 senses the fill level of the buffer 28 and applies a control signal $B_C$ on conductor 34 to the DPCM loop 20 for controlling the coarseness of the quantizer Q of the loop 20. The control signal may be a two bit binary value signal representing four possible fill states for causing four different actions. This is described in more detail in the aforementioned U.S. Pat. No. 4,706,260. The quantizer Q (FIG. 2) may increase the number of zeros produced on conductor 22 i.e., widen the coring region, to reduce the data rate applied to buffer 28 in case of overfill. In case of underfill of the buffer, the control 32 applies a signal on conductor 34 to loop 20 to adaptively change the quantizer so as to increase the data rate to the buffer 28. The output of the buffer 28 on conductor 30 is at a constant data rate and information must be maintained on conductor 30 at that constant rate regardless of the rate at which buffer 28 fills. This is generally described in more detail by way of example, in the aforementioned U.S. Pat. No. 4,706,260 and copending application Ser. No. 127,335. Control signal $B_C$ is also applied to refresh control 36 and to encoder 24 which encodes signal $B_C$ for transmission to receiver 16. The term refresh herein means that straight-forward PCM data is transmitted directly to the receiver without coarse quantization and without encoding.

Refresh control 36, FIG. 1, in response to a horizontal drive signal (HDR) from horizontal drive source 38, and to a vertical sync signal (VS) from source 43 generates a refresh control signal which is applied to refresh operator 40 via conductor 42. Control 36 also produces an initialization signal $I_f$ which internally initializes control 36 to cause PCM to be transmitted for the first transmitted frame and start refresh for the next frame. Signal $I_f$ is applied to encoder 24 via conductor 33 for transmission to receiver 16. Control 36 is responsive to signal $B_C$ for changing the number of frames in a refresh cycle, as will be explained. Source 38 provides a signal which manifests the beginning of each horizontal line in a video raster scan display system. VS manifests the beginning of each frame. $I_f$ manifests the first frame.

Refresh control 36 is clocked by the HDR signal to periodically generate a refresh control signal. The VS signal clocks control 36 so that a refresh cycle only starts at the beginning of a frame. The refresh control signal on conductor 42 is generated in what is effectively quasi-random order relative to the occurrence of the scan lines in successive video frames starting from the time of signal $I_f$. While the refresh control signal, in fact, is generated in fixed periods and is not at all random, it is effective as a random signal relative to the externally related scan line ordinal positions in a frame. The quasi-random order relative to the occurrence of the scan lines is to be differentiated from a pseudo-random order. A pseudo-random order relates to, for example, a pseudo-random number generator which generates what appears to be random numbers based on a complex algorithm and which are independent of external parameters.

Figure 2:
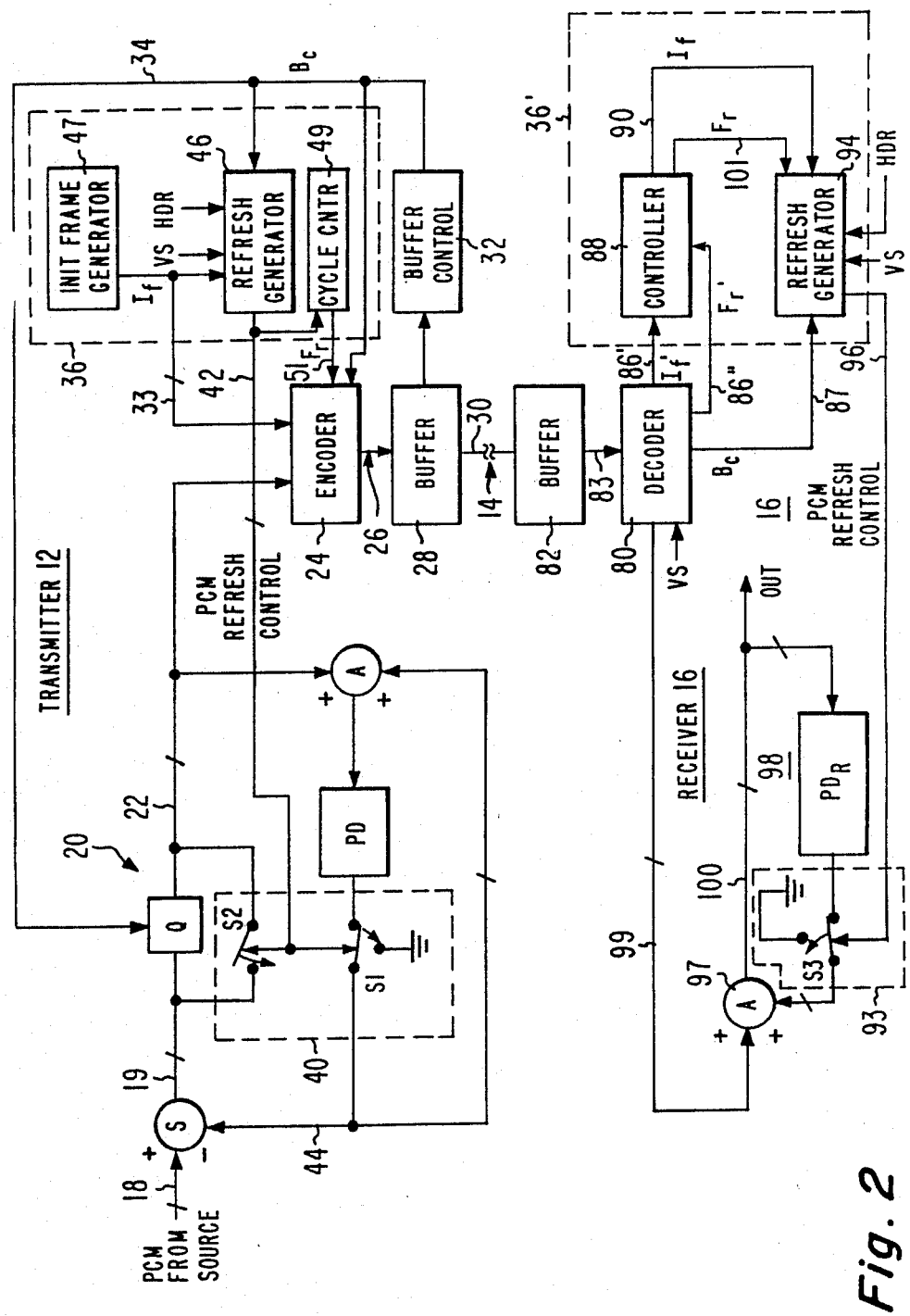
FIG. 2 is a more detailed block diagram of the embodiment of FIG. 1.

Operator 40 includes switches S1 and S2, FIG. 2, represented by mechanical devices which in practice are electronic. When switch S2 is closed by a refresh control signal on conductor 42, the quantizer Q is bypassed. That same refresh control signal simultaneously opens switch S1 and connects conductor 44 connected between adder A and subtractor S to a reference potential, i.e., ground. This effectively results in subtraction of a zero value signal from the finely quantized video signal on conductor 18. This action produces a PCM data signal on conductor 22. The PCM data signal on conductor 22 which remains finely quantized because switch S2 bypasses the quantizer, is added to the reference potential in adder A to effectively load PD with the PCM data rather than the summation of the error signal on conductor 22 and the prediction on conductor 44. The switches S1 and S2 in response to a PCM refresh control signal on conductor 42 selectively cause certain selected scan lines of data to be loaded into the PD circuit as PCM data. The determination of which lines are selected is made by refresh control 36.

Refresh control 36 includes a refresh generator 46, an initialization signal generator 47 and a refresh cycle counter 49. Generator 46 is responsive to the HDR signal, the VS signal, the initialization signal $I_f$ and the buffer control signal $B_C$ on conductor 34 from control 32. Generator 47 produces frame initialization signal $I_f$. Signal $I_f$ has a one frame duration, as shown in FIG. 3. The leading edge of $I_f$ is the sync transition. Signal $I_f$ synchronizes the receiver refresh generator 94, to be explained, to the transmitted first frame. During the period signal $I_f$ is low, the generator 46 is disabled. This causes switches S1 and S2 to be in the PCM load state for one full frame. This ensures a valid PCM frame for the initial frame. The signal $I_f$ resets generator 46 so that the scan line selection mode starts a scan line count at the time of occurrence of the leading edge of $I_f$, i.e. upon removal of a low $I_f$ applied to generator 46. The $I_f$ signal is encoded by encoder 24 via conductor 33 and transmitted over channel 14 to receiver 16. The signal $I_f$ at the receiver causes loop $PD_R$ to be loaded with PCM for that initial frame in a similar way. The VS and HDR signals are each locally generated at the transmitter and receiver.

The PCM refresh control signal is automatically produced by generator 46 on conductor 42 operating switches S1 and S2 periodically to effectively cause transmitter 12 to transmit PCM data rather than DPCM data for selected scan lines. That PCM data, after the initial frame, is refresh data for the receiver and is selected only for certain scan lines of a frame as will be described in more detail below. However, the scan lines selected for refresh are such that over a period of X frames, all scan lines of a frame are refreshed. The selected scan lines of the frames constituting the X frames differ from frame to frame so that any scan line is selected only once in the period comprising X frames. The period of X frames is referred to herein as a refresh cycle.

Cycle counter 49 is a counter which counts the PCM refresh control signals produced on conductor 42. Each PCM refresh control signal selects a scan line for refresh. The total number of scan lines selected in a refresh cycle is Y, or in the case of a display having 525 lines, Y is 525. These Y scan lines occur over X successive frames. The counter 49 counts up to Y and at the count of Y generates a refresh cycle synchronizing signal $F_r$ on conductor 51. The counter 49 resets after counting Y to begin a new Y count. The signal $F_r$ is applied to encoder 24 to be encoded for transmission to receiver 16 via buffer 28 and conductor 30.

Receiver 16, FIG. 1, includes a rate buffer 82 which receives the transmitted encoded data from channel 14. The encoded data is applied from buffer 82 via conductor 83 to decoder 80. Decoder 80 applies the decoded information data to inverse differential pulse code modulation ($DPCM^{-1}$) loop 98 via conductor 99. The output of loop 98 is applied via conductor 100 to post processing circuits (not shown) for display and utilization. Decoder 80 decodes the encoded frame initialization signal $I_f$, the refresh cycle signal $F_r$ and the encoded buffer control signal $B_c$. These decoded signals are applied, respectively, as pulse signals $I_f'$ and $F_r'$ to the receiver refresh control 36' via conductor 86 and as a binary signal $B_c$ to conductor 87. The decoded $I_f'$ signal initializes and resets control 36' which in certain respects is identical to control 36 and signal $F_r'$ resets control 36'. Signal $B_c$ in the receiver performs a similar function as signal $B_c$ in the transmitter. The resetting of control 36' by signal $F_r'$ synchronizes the generation of its PCM refresh control signals for each refresh cycle to the operation of control 36. Control 36' automatically produces PCM refresh control signals on conductor 96 for control of refresh operator 93. Operator 93 in response to the refresh control signal on conductor 96 causes inverse DPCM loop 98 to pass the received PCM data on conductor 99 directly to loop 98 output conductor 100. The $I_f'$ signal allows the PCM data on conductor 99 for the initial frame to pass through to the output conductor 100 and into the predictor of loop 98 via operator 93. All of this will become clearer upon more detailed explanation of controls 36 and 36'.

In FIG. 2, receiver 16, decoder 80 decodes the $I_f$ signal codeword from conductor 83 to produce a frame initialization pulse $I_f'$ on conductor 86'. This pulse is applied to controller 88 of refresh control 36' which expands the pulse into signal $I_f$ of one frame length in duration. The latter signal on conductor 90 disables refresh generator 94 for the initial frame and then resets the generator at the end of that frame similar in operation at generator 46. A decoded $F_r$ signal, signal $F_r'$, is applied to controller 88 via conductor 86''. Controller 88 expands the $F_r'$ pulse into a one scan line duration signal $F_r$. Signal $F_r$ resets generator 94 to synchronize generator 94 with generator 46 for each refresh cycle. Generator 94 generates a PCM refresh control signal on conductor 96 for switching the state of switch S3 of operator 93 which is normally in the positon shown. Switch S3 connects the output of the receiver predictor delay ($PD_R$) or a reference potential, e.g., ground, to adder 97, in accordance with the switch state. A second input of adder 97 is received from decoder 80 via conductor 99. Decoder 80 decodes the information video signal and applies the decoded information signal to conductor 99. The adder 97 output conductor 100 applies the added signals to loop $PD_R$. Loop $PD_R$, switch S3 and adder 97 form an inverse DPCM loop 98 whose output is conductor 100. The initialization signal $I_f$ from controller 88 synchronizes generator 94 with generator 46 so that the same scan lines of the transmitted frame following the initial PCM frame and selected by generator 46 are also selected by generator 94. Generators 46 and 94 are otherwise asynchronously operated relative to each other via the locally generated HDR and VS signals.

When the encoder 24 receives direct PCM data from subtractor S, encoder 24 is bypassed and PCM data is passed directly to buffer 28. The PCM data includes data codes that indicate to the encoder 24 that PCM data is being applied and is not to be encoded. How to do this is within the skill of those of ordinary skill in this art.

However, PCM data which is not encoded includes a relatively large number of data bits as compared to encoded data based on statistical coding. If the buffer 28 is full or filling too fast, then control 32 senses this fill status and sends control signal $B_c$ to generator 46 to slow the PCM generation process, selecting fewer lines per frame or temporarily halting the generation of PCM data, since an overfilled buffer is more serious an event than the delay of refreshing the receiver scan lines. The aforementioned U.S. Pat. No. 4,706,260 discloses one embodiment of control 32. The signal $B_c$, decoded by decoder 80, causes generator 94 to select the same number of frames for a given refresh cycle as the transmitter generator 46. The same scan lines will be selected at the transmitter and receiver for the same frame of a given refresh cycle. Further, generators 46 and 94 each include means to be described in connection with FIGS. 3a and 3b for permitting the respective generators to complete the line selection process for the current frame in process. At the end of this frame, a new number of scan lines is set for a new refresh cycle.

FIG. 3a illustrates one embodiment of refresh generator 46. Generator 46 includes a refresh number switch set 48 whose output is a binary number applied through conductors $50_a$-$50_n$ to a divide-by-N down counter 54. Each of the conductors $50_a$-$50_n$ carries a signal having a binary value to produce a binary number of a given fixed value. The switches in switch set 48 may comprise electronic devices which, for example, couple conductors $50_a$-$50_n$ to either a positive voltage or to ground. The switches may be electronic devices which are controlled by a setable control signal. The switches in set 48 are also responsive to a rate buffer fill status signal $B_c$. Signal $B_c$ is latched into set 48 via register 41 at the beginning of each frame by the locally generated vertical sync signal VS applied to register 41.

The value of signal $B_c$ may increase or decrease the value of the binary number represented by the signal values on conductors $50_a$-$50_n$ as needed to control the rate of fill of buffer 28 (FIG. 1). The purpose of changing the number produced by the switch set 48 in response to the rate buffer fill status signal on conductor 34' is to change the rate at which refresh data is generated to therefore modify the rate data is applied to the buffer 28, FIG. 2. However, register 41 being latched by the vertical sync signal ensures that the number in set 48 is not changed until the present frame refresh lines have been selected and processed.

Generator 46 includes a divide by N down counter 54. Counter 54 is a parallel load unit which receives simultaneously all of the binary values from conductors $50_a$-$50_n$. Numbers are loaded into the counter 54 upon receipt of an HDR clock pulse whenever the load input is low. A low load input can occur if the $I_f$ signal or the counter 54 RCO output on conductor 56 is low. The counter 54 output at the RCO conductor 56 switches from a low to a high upon receipt of that HDR pulse immediately after the number from the switch set 48 is loaded into the counter. Each subsequent horizontal drive signal pulse (HDR) decrements the counter by one. After N decrements, the count goes to zero and the RCO output goes low. This low is transferred to the load input via AND gate 58, thus reinitiating the cycle. AND gate 58 serves as an OR gate for low level input signals. The low on conductor 56 (or on conductor 33 for the $I_f$ signal), thus passes to conductor 42 via AND gate 58. A low on conductor 42 is the PCM refresh control or $I_f$ signals that cause switch S1 to connect ground to conductor 44 and close switch S2 (FIG. 2). The counter 54 is synchronous and performs the counting operation upon the receipt of a horizontal drive (HDR) clock pulse at its clock input. The number produced by the switch set 48 has a binary value N. When the divide by N countdown is finished, i.e., the count goes to zero internally, the counter ripple carryout output (RCO) goes low. The low output on the RCO output thus occurs on the Mth (N+1) count. The first clock pulse of the M count produced by the HDR signal merely loads the number N into the counter. Subsequent clock pulses decrement the counter resulting in an HDR clock pulse count of N+1. The pulse used to load the counter has to be included in the count since each HDR clock pulse represents a scan line. The value of M is unique as it is determined relative to the number of scan lines to be selected for refresh in a given frame. It can be shown that M is the number of frames in one complete refresh cycle. Upon the application of the zero value signal by the RCO output to conductor 56, the counter 54 is reset so that the counter will reload the binary number from the switch set 48 upon the next received HDR clock signal. At the time the signal VS clocks the value of signal $B_c$ on conductor 34', the number N in set 48 may change to a new number if the value of $B_c$ has changed. Of course, VS and HDR are concurrent at this time. A second input to gate 58 is the first frame initialization signal $I_f$ discussed above.

The video signal received by the transmitter on conductor 18 (FIG. 1) comprises a series of video frames A, B, C and so forth as illustrated in FIG. 4. Each frame is illustrated as comprising ten scan lines for simplicity of illustration. In practice, a given video frame may comprise 525 scan lines. Successive frames, for example, frames A, B and C each have the same number of scan lines. A succession of frames contains a sequence of contiguous scan lines each line occurring in a given time period of a frame as determined by the HDR signal. The number of scan lines in a given frame in practice, of course, could be different than the 525 scan lines presently in use in video transmission systems.

The value of N produced by the switch set 48 is determined so that M does not have any factors in common with the total number of scan lines S in a given frame. For example, assume frame A, as all of the frames of FIG. 4, has ten scan lines. The allowable values of M are numbers which do not have common factors with the number ten. That is, M cannot have a value that is either 2 or 5 or multiples of 2 or 5. In practice, in a 525 scan line system, M cannot have a value of 3, 5 and 7, or interger multiples of those numbers, the factors of 525. While M generally can have any other number, it is preferred that M has a certain value which does not produce artifacts in the visible image as will be explained.

In the representation of FIG. 4, M is illustrated as having a value of seven. Upon the occurrence of the HDR signal for each successive seventh scan line, generator 46 generates a PCM refresh control signal which selects that scan line to be refreshed. For example, in FIG. 4, scan line 60 is the Mth line in the video frame A, in this case, the seventh line. The next scan line which is the seventh scan line from scan line 60 is scan line 62. Scan line 62, however, is the fourth scan line in frame B. The next scan line which is M scan lines in time from line 62 is line 64. Line 64, however, is the first line of frame C. The next Mth scan line is line 66 which is the eighth scan line of frame C. Further, the next scan line, assuming M remains a constant, is scan line 68 of frame D. This scan line is the fifth scan line. Over the ensuing frames (not shown) the scan line which will be refreshed are: the second, ninth, sixth, third, and tenth. At this point, all lines have been refreshed and the cycle repeats. The refresh cycle thus encompasses seven frames. As mentioned abaove, it can be shown that the refresh cycle always comprises M frames. Therefore, the selection of N also selects the number of frames in a given refresh cycle.

This process of selecting the Mth scan line from the previous scan line for refresh purposes is automatically continued for all video frames. Assuming M is seven for a ten line system, then the refresh cycle signal $F_r$ is generated for every tenth PCM refresh control signal generated, or whenever the last line in a frame is refreshed. The number M is such that the selected refreshed scan lines in successive frames are not spatially close (i.e., adjacent) to one another to preclude the production of an artifact such as window shading. This artifact gives the appearance that the refresh lines are scrolling vertically (up or down) in the video displayed image. For example, if the first scan line of frame A, the second scan line of frame B, the third scan line of frame C and the fourth line of frame D and so on were selected for refresh, the refreshed scan lines of adjacent frames would visably appear to be moving downward vertically in the video image. That motion would appear to a normal viewer as a scrolling line and is objectionable. It can be shown that the value of M can be easily determined by one of ordinary skill in the art.

In the present embodiment it can be shown that N can be conveniently set so as to make M a power of 2. For example, N may have a value 1, 31, 63 and 127 in a 525 scan line frame. These numbers are such that the corresponding refresh cycles have respectively 16, 32, 64, and 128 values. These values of M are generally convenient approximately 1, 2, 4 or 8 second intervals in a 15 frame-per-second system or ½, 1, 2, or 4 seconds in a 30 frame-per-second system. Values of M, which are binary numbers, are convenient to use and their selection does not add complexity to the transmission system.

Figure 3B:
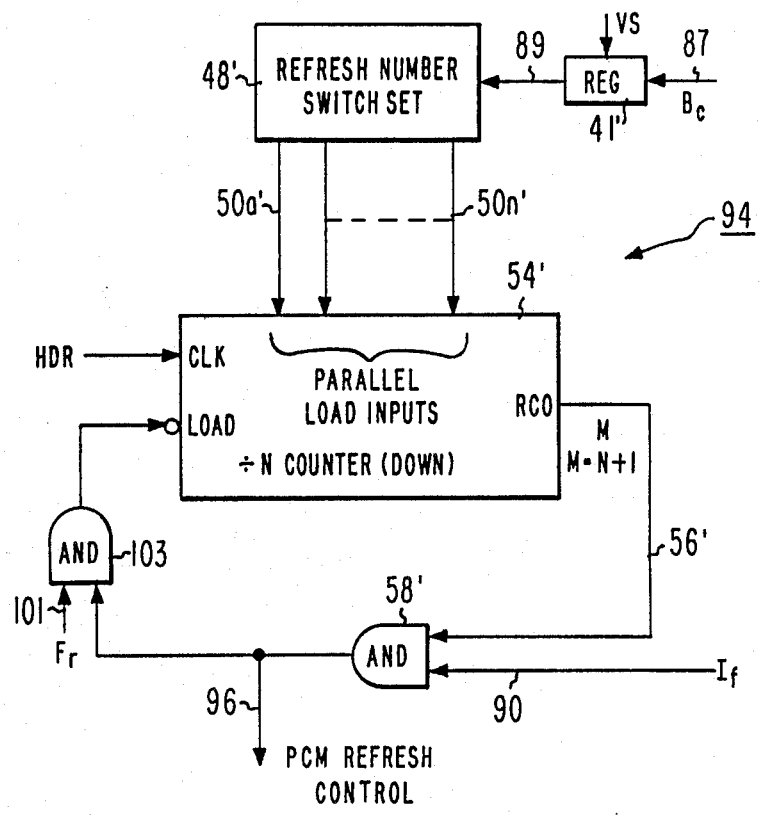

In FIG. 3b, receiver refresh generator 94 is shown in more detail. Parts with same primed and unprimed reference numerals in FIGS. 3a and 3b are identical. The operation of generator 94 is substantially the same as generator 46. The significant difference is that the signal $F_r$ is applied to generator 94. Signal $F_r$ is applied to conductor 101 from controller 88 (FIG. 2). Recall signal $F_r$ is a pulse one scan line in duration. This signal is applied to the load input of counter 54' via AND gate 103. AND gate 103 serves as an OR gate for low signals as does AND gate 58'. Whenever signal $F_r$ low is applied to gate 103 it causes counter 54' to load the number N at the next HDR pulse. This ensures the counter 54' is reset at each refresh cycle represented by signal $F_r$. Signal $F_r$ is made one scan line in duration to ensure an HDR pulse is coincident therewith. The expanded $I_f$ signal on conductor 90 is applied to AND gate 58' to disable counter 54' for one frame (the initial frame). This causes a low for one frame duration on conductor 96. This low permits received PCM data (FIG. 2) on conductor 99 to be passed to conductor 100 by causing switch S3 to connect ground potential to adder 97. In all other respects, generator 94 is the same as generator 46.

In the alternative to the number generators of generators 46 and 94, a pseudo-random number generator could be used to create a refresh control signal in which a number is produced which is pseudo-random independently of the occurrence of the scan lines in a frame. Such randomness is relative to the generator as well as to the scan lines but has the drawback of requiring correlation between the transmitter and receiver generators. It is a relatively complex problem to synchronize a receiver random number generator with a transmitter random number generator using a pseudo-random generator at each site because of the complex algorithms used to generate the random numbers. Such number generation must be identical at the receiver and transmitter to properly function. In the present system, it is a simple matter for constructing refresh generators 46 and 94 which are easily synchronized at the receiver and transmitter. All that needs to be done is set the value of N to the same number in the refresh generator switch sets in the receiver and transmitter. This greatly simplifies the correlation problem between the two ends of the transmission system which are otherwise asynchronous.

As mentioned above, in FIG. 3a, a rate buffer fill status signal $B_C$ is applied via conductor 34 and register 41 to the switch set 48. Assuming, for example, that the rate buffer is overfilling, the rate buffer fill status signal $B_C$ on conductor 34 indicates this overfill condition. PCM data in a refresh signal produces data at a much higher rate than quantized data which tends to compress the video information signal. It is desirable to expand in duration the cycle of the refresh scan lines as much as possible to avoid overfilling the rate buffer at an increased rate due to the PCM generated data. The overfill signal $B_C$ on conductor 34 causes the switch set 48 to increase the value of the selected number N at the beginning of the next frame. For example, the number N normally may be set at 15 but if the rate buffer fill status is indicating overfill, the number may be set at 127 or 215 or even larger numbers. The larger the number, the more infrequent the occurrence of a refresh scan line. The frequency can be set so that the number of frames in a refresh cycle, that is, where every line of a frame is eventually refreshed, can be large, for example, 1K or more frames. This implies M is 1K for this situation. However, all lines selected for a given frame based on a given number N are refreshed before N is changed. In a similar manner, signal $B_c$ resets the number N in the receiver generator 94.

Assume that the rate buffer is underfilling, then it is desirable to add more data. In this case, the signal $B_c$ on conductor 34 sets the switch set 48 to a smaller number at the beginning of the next frame. This increases the number of refresh lines in a given frame of that refresh cycle and therefore decreases the number of frames to complete that refresh cycle. Each refresh cycle is started at a next frame regardless if the number N is the same or different in successive cycles.

In FIG. 1, encoder 24 is of a statistical type as discussed in the introductory portion. In particular, the encoding may be according to procedures described by Huffman for encoding variable length codes optimally. Further, encoder 24 may be of the type that encodes both non-zero and zero run lengths. One such encoder may be as described in U.S. Pat. No. 4,420,771 issued to Pirsch. In this patent, a coded representation of each run length as well as representation of the non frequent values which make up every other run are combined in a predetermined sequence. Different code tables are used to generate codewords for each type of information. Another system for encoding non-zero and zero run length values is disclosed in the aforementioned copending application entitled "Modified Statistical Coding of Digital Signals". However, still other encoders are known for statistically encoding digital signals employing Huffman procedures.

Figure 5:
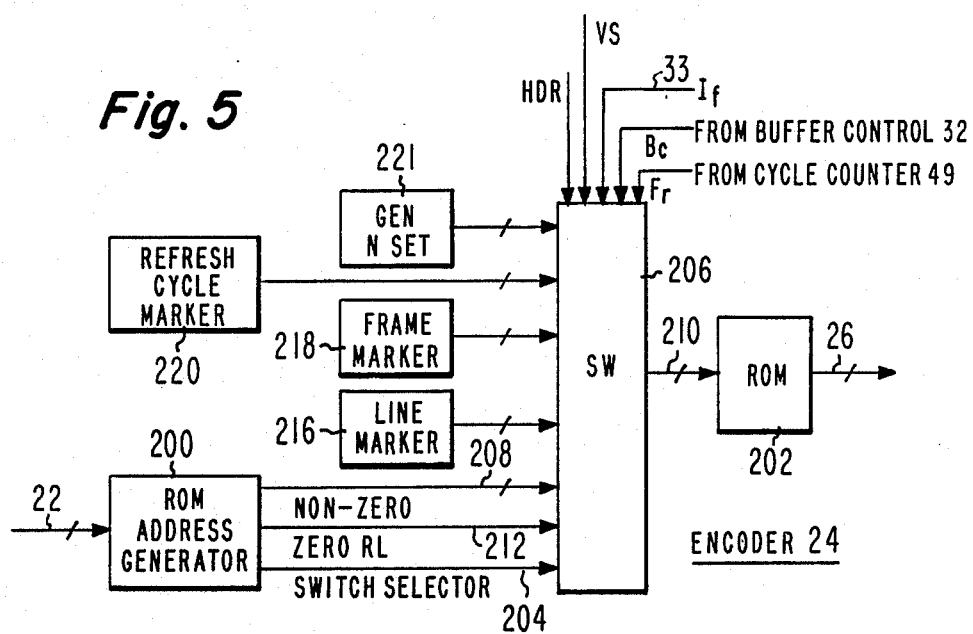
FIG. 5 is a block diagram of the encoder of the embodiment of FIG. 2.

In FIG. 5, one embodiment of encoder 24 is described in more detail. Encoder 24 includes a ROM address generator 200 for receiving data to be encoded. The ROM address generator may be one or more shift registers and logic circuitry, for example AND gates and inverters, for segregating non-zero and zero run length codewords into appropriate addresses to a code look-up table in ROM 202. The address generator 200 analyses the incoming data signal on conductor 22 for the presence of non-zero and zero run length data. If non-zero value data is detected, a signal is applied to conductor 204 which controls the state of switch 206. In this case, should non-zero value data be detected, then that non-zero value data is applied via conductor 208 to ROM 202 through switch 206. The switch position of switch 206 has previously been selected by the signal on conductor 204 in response to a positive test for a non-zero value to cause the signal on conductor 208 to address the ROM 202 with that selected data signal as an address.

The ROM 202 contains a code table, which for example, may comprise multiple ROM tables as disclosed in aforementioned U.S. Pat. No. 4,420,771. In the alternative, the ROM 202 code table may comprise a table similar to that described in the aforementioned copending application Ser. No. 130,379. In a still different alternative, the table may be one in which non-zero and zero run lengths are formed into a signal table based on the Huffman procedure. In any case, ROM 202 includes a look-up table comprising non-zero values corresponding to each of the received codewords on the data conductor 22 and zero run length values comprising binary numbers. Each binary number represents the number of zeros in a given run length. The data on conductor 22, if representing a non-zero value once identified as such by the generator 200, applies that data as an address to the ROM via switch 206 and conductor 210.

If the received data on conductor 22 is a sequence of pixels representing a run length of a given number of zeros, the ROM address generator 200 determines the run length of zero value pixels and places this value on conductor 212. Generator 200 also at this time applies a switch selector signal on conductor 204 causing switch 206 to select conductor 212 as the address to ROM 202. In this case, generator 200 generates a number representing one or more zero value pixels. That binary number on conductor 212 is applied through the selected switch 206 switch position to conductor 210 to address the look-up table in ROM 202. Depending upon whether the address to the table ROM 202 is a non-zero or a run length value an appropriate codeword is generated by ROM 202 on conductor 26.

Switch 206 has several additional ROM address inputs comprising a line marker address source 216, a frame marker address source 218, a refresh cycle marker source 220 and a generator N set address 221. Not shown is an $I_f$ address source. The line marker address source 216 provides an address to the ROM 202 which addresses a unique codeword in ROM 202 which represents a line marker signal. In the case of a video signal, which by way of example, is described in this embodiment, the marker codewords created by ROM 202 when addressed by the address from the line marker address source 216 are generated at the beginning of each scan line in a video raster display system. To this extent, the switch 206 is responsive to a locally generated horizontal drive sync signal (HDR) derived from source 38 (FIG. 1) to cause the address from source 216 to be applied to ROM 202.

When the HDR signal is applied to switch 206, switch 206 selects the address input from the marker address source 216 and that becomes the address to the ROM 202. ROM 202 then outputs a codeword on conductor 26 at the beginning of an encoded scan line. That marker codeword is unique only to this marker and may comprise a sufficiently unique robust combination of bits to be easily recognized by the decoder in the presence of a single bit error in that codeword. By way of example, such a marker codeword may comprise a set of prefix and suffix bits unique to a Huffman statistical procedure.

Frame marker source 218 provides an address to ROM 202 which addresses a unique codeword in ROM 202 which represents a frame marker signal. In the case of a video signal, the frame marker codewords are generated at the beginning of each video frame in a video raster display. Switch 206 is responsive to vertical sync (VS) signals derived from source 43 (FIG. 1) which cause switch 206 to output the frame marker addresses at each vertical sync pulse. With respect to the refresh cycle marker, the refresh cycle counter 49 (FIG. 2) output signal $F_r$ is applied to switch 206 to cause switch 206 to select the refresh cycle marker codeword address from source 220. This address causes ROM 202 to output a codeword unique to the refresh cycle signal $F_r$. Not shown in FIG. 5 is the encoding of signal $I_f$ which is encoded similarly to the encoding procedure for the markers. The $I_f$ signal switches the state of switch 206 to address the $I_f$ codeword in ROM 202 from an address source not shown.

The buffer control signal $B_c$ is an input to switch 206 to select a generator N set address from source 221. As mentioned, signal $B_c$ is a two-bit signal that indicates four possible states. Each state selects a unique ROM 202 address from generator N set source 221. Recall that each $B_c$ two-bit signal represents a given number N to be set in the generators 46 and 94 switch sets (FIGS. 3a and 3b). The address from source 221 is one which selects a unique codeword in ROM 202 for transmission to the receiver. That unique codeword is one which defines a number N so that after transmission and decoding, the receiver switch set has the same number N as the transmitting switch set for a given refresh cycle. Assuming source 221 generates four different addresses corresponding to four different numbers N based on the value of $B_c$ one of those addresses is selected to cause ROM 202 to output a corresponding codeword for that selected number N. A set of marker codewords by way of example, is described in more detail in the aforementioned patent application Ser. No. 130,379.

Figure 6:
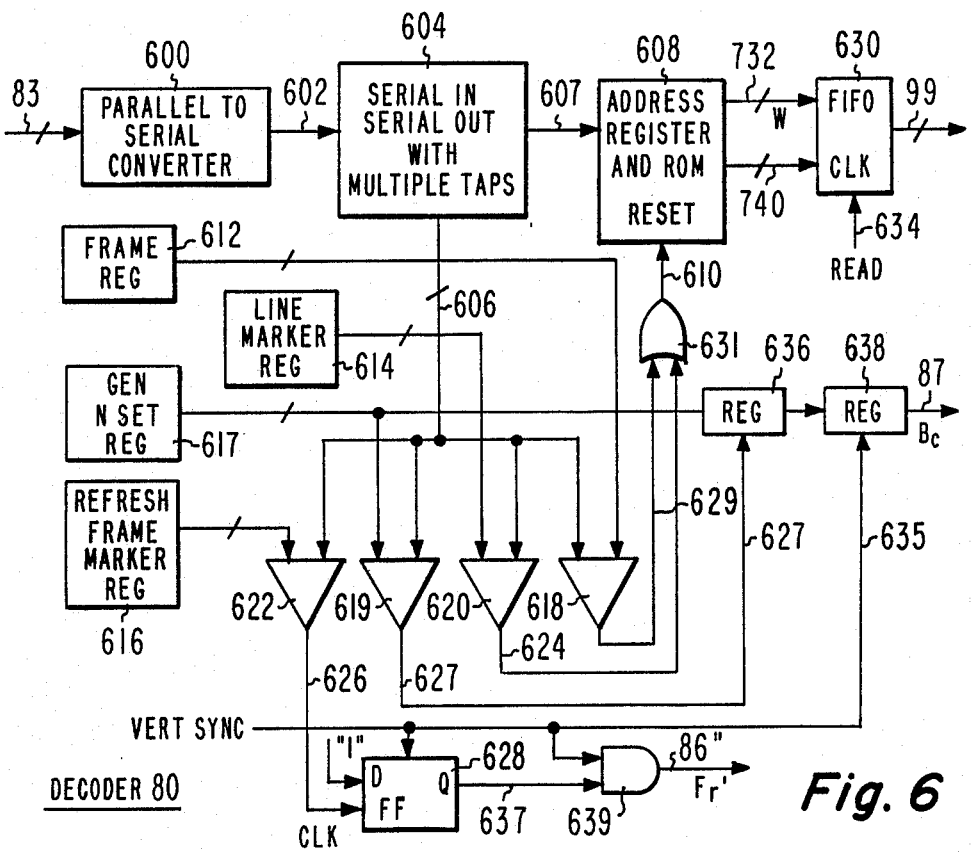
FIG. 6 is a block diagram of the decoder of the embodiment of FIG. 2.

In FIG. 6, decoder 80 includes a parallel-to-serial converter 600 which receives the transmitted data from buffer 82 (FIG. 2) on conductor 83. The parallel-to-serial converter 600 converts the parallel bit streams of conductor 83 into a serial stream of bits on conductor 602 and applies that serial stream of bits to serial in/-serial out register 604 which has multiple taps, conductor 606. The other output of register 604 is applied via conductor 607 to decoder address register and ROM 608. The address register and ROM 608 comprises one or more address registers which are responsive to the serial codewords on conductor 607 for addressing appropriate addresses in ROM 608 having a look-up table. The look-up table of ROM 608 contains the decoded information corresponding to the particular addresses determined by a given received codeword. ROM decoders and address registers generally are known. The address generator portion of ROM 608 used for generating the ROM addresses are initialized by a reset signal applied as an input thereto on conductor 610.

Figure 7:
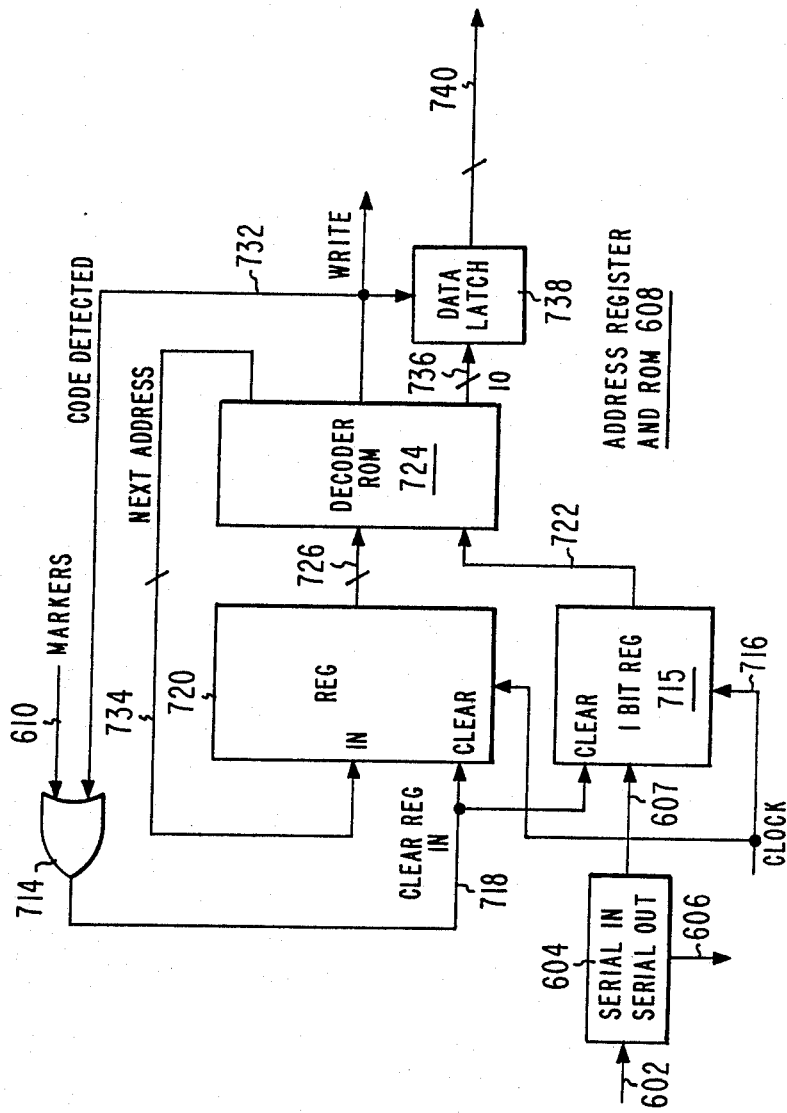
FIG. 7 is a more detailed block diagram of the address register and ROM of the decoder of FIG. 6.

In FIG. 7, one implementation of ROM 608 is shown. The output of register 604 is applied to register 715 which is a 1-bit register sometimes referred to as a flip-flop. Register 715 receives a clock signal from a clock source on conductor 716 and a clear signal on conductor 718. The clear signal on conductor 718, received from OR gate 714, is also applied to register 720. The output of register 715 is applied via conductor 722 to the decoder ROM 724. The output of register 720 is applied on conductor 726 to decoder ROM 724. The outputs of registers 715 and 720 together form a look-up address to ROM 724. Register 720 is an n-bit register, which in this example may be 9 bits, which combines with the 1 bit from register 715 to form a 10-bit address to the ROM 724.

Each address in the decoder ROM 724 contains three fields, the next address field, the data field and a code detected flag field. The data field contains the decoded data corresponding to a detected codeword as represented by the information from registers 715 and 720. The data for a decoded codeword is only at certain locations of the ROM.

The next address field contains n bits forming a partial address for the next access to the ROM 724. The addressing of ROM 724 is sequenced using a binary tree algorithm. The ROM address registers 720 and 715 are initialized to zero when cleared. Stored in the ROM at the reset (clear) address location are n bits of data representing a next address portion, which when combined with a bit from register 715 forms an additional address creating a second or third branch address, depending on the value of the register 715 bit. Stored in locations at those respective branch addresses are additional partial addresses (nodes) that point to still other ROM locations. The bit value from register 715 is always used in conjunction with the bits from the ROM next address field to create new addresses to traverse the ROM.

For example, the first clearing location accessed in ROM 724 may have an address of 000 created by clearing register 720 and a zero clocked from register 715. The next address field of ROM 724 at location 000 may have a partial address of 01. The most significant bits portion of the next address to be traversed is stored in the ROM 724 and the least significant bit portion of that address will be latched from register 715. If a zero is latched into register 715 at the next clock pulse, the complete next address is 010. Thus, the bit from register 715 supplies an address branch from a node, i.e., a node whose tree address is 01, of the binary tree search algorithm. The procedure is continued until a codeword is found. The address to a binary tree node is stored in the ROM and the branch bit portion of the address to a next node is supplied by register 715. The data field contains decoded codewords corresponding to a complete codeword manifested by the sequence of bits from register 715 over a period of a plurality of clock pulses.

The flag field contains a bit whose value represents the presence or absence of a decoded codeword at that address. If the data represented by the data field described above represents a complete received codeword, then the flag bit for these ROM locations has a binary value representing the receipt of a complete codeword, for example, a binary one. If a given ROM location does not represent a complete received codeword, then the flag assigned to that ROM location has the opposite binary value —i.e., continuing the example, a binary zero.

Output bus conductor 734 of ROM 724 receives the next partial address information from the ROM memory at the current addressed location. The conductor 732 receives the binary one codeword detection information bit flag (and binary zero no codeword detected bit flag). Output bus conductor 736 receives the data portion, i.e, the codeword. The next address code applied to conductor 734 contains the partial address of the next memory location, i.e., the nodes of the tree as explained above, and sequentially follow the initial memory location address in binary tree order based on the successive values of the bits from register 715 as discussed.

In operation of ROM 608, an encoded signal is converted to a serial stream of bits by converter 600 (FIG. 6) which applies the bits one bit at a time to register 715 through register 604. A clock signal on conductor 716 clocks the contents of register 715 via conductor 722 to ROM 724 in conjunction with clocking the contents of register 720 to form the complete n-bit ROM address. When either line or frame marker signals on conductor 610 or the code detected signal on conductor 732 is high, a clear signal from OR gate 714 on conductor 718 is applied to registers 720 and 715. The clear signal clears registers 720 and 715 and provides a zero address to ROM 724, resetting it to the first memory location. The marker signals on conductor 610 are high when the codes in registers 612 and 614 (FIG. 6) match the received marker codes.

If register 715 has a zero output on conductor 722, then the initial zero address of ROM 724 is addressed. Since the register 720 has been cleared and the register 715 has supplied only one bit from a codeword to the ROM 724 and assuming the minimum code length for one code is two, no codeword can be detected at this address. ROM 724 outputs a zero flag value on the code detected conductor 732 and outputs on bus conductor 734 the address of the node to the next sequentially stored memory location in ROM 724. This next node address will be clocked into register 720. In conjunction with the output of register 715, i.e., the branch bit, a complete address is applied at the next clock to ROM 724 via conductors 726 and 722.

If the address comprising the bits on conductors 726 and 722 do not represent a received codeword, then the next addressed memory location in ROM 724 will output a lack of code detection flag signal on conductor 732, that is a binary zero value, and also a next node address on bus conductor 734. Whether or not a code is detected is known a priori by the combination of a given ROM stored partial address and the output of register 715. That is, each codeword is at a branch address of a node in the search procedure. Depending on the nodes of the tree reached, a given memory address in combination with the known code bit output of register 715 can be determined to constitute a codeword. If that combination is known to form a codeword, then that complete input address will access the memory location containing the decoded codeword. Thus, a given number of cycles of next address in combination with a given output level from register 715 traverses the search tree and represents a decoded codeword. At the next clock signal on conductor 716, the address on conductor 734 will be latched in register 720. This address along with the next bit of the encoded signal from register 715 will form the new address to ROM 724. If this combination of bits on conductors 726 and 722 represents a codeword (for example, a zero or non-zero value), then the ROM 724 will output a code detected signal, a binary one flag value on conductor 732. This binary one flag value clears register 720 and will output on bus conductor 736 the codeword representing that detected code value corresponding to that address (or sequence of bits through register 715). That codeword on conductor 736 is applied to data latch 738.

The binary one flag signal on conductor 732 is a latch signal for latch 738. Whenever the next address on conductor 734 represents a lack of code being detected in ROM 724, the code detected flag signal on conductor 732 is low; therefore no latch signal on conductor 732 is applied to latch 738. In this way, latch 738 is not latched and the bits on conductor 736 are not applied to conductor 740. If a codeword is detected the high on conductor 732 will latch the data on bus 736 into latch 738 and thus, to conductor 740.

Decoder 80, FIG. 6, further includes a frame register 612, a line marker register 614, a refresh frame marker register 616 and a generator N set register 617. Not shown is an $I_f$ register. Frame register 612 contains the codeword corresponding to the frame marker codeword stored in ROM 202 (FIG. 5) and addressed by frame marker address source 218. Line marker register 614 contains a line marker codeword which corresponds to the codeword stored in ROM 202 (FIG. 5) addressed by the address in the line marker address source 216. The refresh frame marker register 616 contains a codeword corresponding to a refresh frame marker codeword stored in the ROM 202 and addressed by the refresh cycle marker source 220. The generator N set register 617 contains a plurality of codewords each representing a different refresh cycle length. These codewords correspond to the codewords stored in ROM 202 addressed by source 221. Not shown is a register for signal $I_f$ (FIG. 5) containing its codeword. This codeword corresponds to a codeword stored in ROM 202 addressed by an $I_f$ address source (not shown) in the encoder 24, FIG. 5.

The frame marker codeword produced by frame register 612 is compared to the codeword signals on conductor 606 by comparator 618. The line marker codeword produced by register 614 is compared to the codeword signals on conductor 606 by comparator 620. Comparator 622 compares the codeword produced by refresh frame marker register 616 with the codeword signals on conductor 606. Comparator 619 represents a plurality of comparators each of which compares a different codeword from register 617 to the codewords on conductor 606. Recall that the different codewords from register 617 represent different values of the number N (the values of signal $B_c$). Whenever the codewords on conductor 606 and from register 612 match, the output of comparator 618 will produce a frame marker signal on conductor 629. Whenever a line marker codeword is received on conductor 606 and matches the line marker codeword in register 614, a line marker having a given value, i.e., an active value, is produced by comparator 620 on conductor 624. Whenever the codeword produced by register 616 matches a codeword sensed on conductor 606 by comparator 622, the match will result in comparator 622 providing an active signal $F_r$ on conductor 626. Similarly, the $I_f$ signal has a corresponding comparator (not shown) for generating an active signal $I_f$ when $I_f$ is detected. Whenever one of the codewords produced by register 617 matches a codeword on conductor 606, the output of one of the comparators of comparator 619 is made active on conductor 627.

This active signal on conductor 627 is used to latch that detected codeword into register 636. The register 636 output is applied to conductor 87 via register 638 which is latched by a locally generated vertical sync signal on conductor 635. This applies signal $B_c$ to conductor 87 at the beginning of a frame. The value of signal $B_c$ sets the number N in the switch set of generator 94. This number N is the same number created in set 48 of transmitter generator 46 by the signal $B_c$ of the same value generated by buffer control 32. This action ensures the number N is not changed until all of the scan lines selected for refresh in the prior frame are refreshed by generator 94 similar to what was done by generator 46 in the receiver.

Conductor 626 is connected to the clock input of a D flip flop 628 whose D input is held at a "1" state. This causes the Q output on conductor 637 to go high at each clock pulse. NAND gate 639 will be enabled by this logic high and a low $F_r$ pulse will be issued on conductor 86″ until the next vertical sync signal on conductor 635. The vertical sync signal on conductor 635 also clears the D flip flop 628. The value of the D input is transferred to the Q output on receipt of a clock signal (the active output of comparator 622). The refresh frame marker detected signal on conductor 626 forces the logic "1" on the "D" input of flip-flop 628 to conductor 637 upon the occurrence of a received coded $F_r$ signal on conductor 606. Thus, the same vertical sync signal which clears the flip flop 628 to make the signal on conductor 637 low also is used as an enabling signal to NAND gate 639 to create signal $F_r'$, which is a relatively short duration pulse.

Because of the above action, the vertical sync signals representing each frame are not passed to conductor 86″ except when gate 639 is enabled by the flip flop 628 Q output, i.e., a refresh cycle marker. In this way, the signal $F_r'$, the output of gate 639, is synchronized with the vertical sync signals at the beginning of a frame.

This synchronization is employed because the marker codewords are transmitted as compressed data. Because of compression, the reconstituted markers are otherwise asynchronous with the locally generated vertical sync signals. Controller 88 (FIG. 2) creates signal $F_r$ from signal $F_r'$. Signal $F_r$ not only sets the counter of refresh generator 94 but does so in synchronism with the reconstituted frames. Signal $I_f'$ (not shown in FIG. 6) is processed similarly as signal $F_r$ using a D flip flop, a NAND gate and the HDR signal to create a pulse. The processed $I_f'$ signal is applied to controller 88 via conductor 86', FIG. 2 to expand the pulse as discussed.

The reconstituted signal $F_r'$ on conductor 86" from gate 639 is expanded by controller 88 and then applied to the refresh generator 94 (FIG. 2) via conductor 101. The expanded signal $I_f$ from controller 88 is applied to refresh generator 94 via conductor 90. The $I_f$ and $F_r$ signals are applied to the AND gate 58' of generator 94, FIG. 3b.

Conductors 624 and 629, FIG. 6, the outputs of comparators 620 and 618, respectively, are connected to the reset (clear) input of the ROM 608 address register 720 (FIG. 7) via conductor 610 through OR gate 631. The line marker and frame markers signals on respective conductors 624 and 629 resynchronize the address register 720 so that it will hunt for new codewords from the serial bit stream on conductor 607.

The output of ROM 608 applies data via conductor 740 to a FIFO memory 630 which provides a one frame store delay. FIFO memory 630 is clocked with a write signal on conductor 732 from ROM 608. The output of FIFO memory 630 is applied to conductor 99 upon receipt of a read signal on conductor 634 from the inverse DPCM loop. The read signal is timed by vertical sync signals in the inverse DPCM loop.

What is claimed is:

1. In a DPCM communication system including a transmitter for transmitting a plurality of frames of a compressed digital encoded information signal over a channel to a receiver, the transmitter including a DPCM loop which produces an error signal representing the differences between a predicted signal and a current PCM signal having the same spatial position in successive frames, each frame comprising a plurality of S lines, said receiver including an inverse DPCM loop for adding a current predicted signal, formed from a prior decoded error information signal, to a current decoded error information signal to produce a reconstituted signal, the signal in the inverse DPCM loop tending to become corrupted upon loss of the current decoded error information signal, the combination therewith comprising:

refresh means at the transmitter and receiver each for periodically refreshing the same selected ones of said lines in a given sequence with PCM data for a plurality of frames over a plurality of refresh cycles wherein in each cycle each scan line of a frame is refreshed; and means for periodically synchronizing said refresh means at the receiver and transmitter.

2. The system of claim 1 wherein said means for synchronizing includes marker means for generating a refresh marker signal representing the start of each said selected refresh cycle and means at said receiver responsive to said generated marker signal for initializing the refresh sequence of said selected refresh cycle.

3. The system of claim 1 wherein said receiver includes a decoder, said decoder including means for decoding said encoded error information signal in a given decoding sequence, said decoder including means for reinitializing the decoder decoding sequence for each transmitted line and frame.

4. The system of claim 1 wherein said means for synchronizing includes means for resetting a selected refresh cycle at the beginning of the next transmitted frame.

5. The system of claim 1 wherein said refresh means includes reset means responsive to an applied reset signal for resetting the selection of said scan lines to the beginning of said refresh cycle sequence; and said means for synchronizing including means for encoding said information signal with a plurality of refresh cycle marker signals each marker signal corresponding to the beginning of a refresh sequence and means responsive to each said encoded marker signal for generating said reset signal and for applying said generated reset signal to said refresh means to thereby reset the refresh means to commence said sequence.

6. The system of claim 1 wherein said transmitter includes a rate buffer tending to over and underfill, said system including means for generating a fill status signal having a value manifesting the fill of said buffer, said refresh means at the transmitter and at the receiver each including means responsive to said fill status signal for altering the frequency of generation of said given sequence of PCM data in a given refresh cycle according to the value of said fill status signal, said altering tending to stabilize the fill of said buffer.

7. The system of claim 6 wherein said means responsive to said fill status signal includes means for synchronizing the altering of the frequency of occurrence of said PCM data with the beginning of the next occurring frame.

8. In a DPCM communication system including a transmitter for transmitting a plurality of frames of a compressed digital encoded information signal over a channel to a receiver, the transmitter including a DPCM loop which produces an error signal representing the differences between a predicted signal and a current PCM signal having the same spatial position in successive frames, each frame comprising a plurality of S lines, said receiver including an inverse DPCM loop for adding a current predicted signal, formed from a prior decoded error information signal, to a current decoded error information signal to produce a reconstituted signal, the signal in the inverse DPCM loop tending to become corrupted upon loss of said current decoded error information signal, a system for refreshing said inverse DPCM loop with unencoded PCM data comprising:

refresh means at the receiver and transmitter for periodically refreshing selected ones of said lines in a given sequence with PCM data for a plurality of frames over a refresh cycle wherein each scan line of a frame is refreshed;

means for generating a plurality of refresh cycle synchronizing signals each synchronizing signal corresponding to the beginning of said refresh sequence; and means at the receiver responsive to each said synchronizing signal for causing said receiver refresh means to reset and commence said sequence.

9. The system of claim 8 further including line and frame synchronizing signal generator means for encoding a line synchronizing signal at the beginning of each said S lines and for encoding a frame synchronizing signal at the beginning of each frame, said receiver including a decoder, said receiver including means responsive to said encoded line and frame synchronizing signals for generating a decoder reset signal, said decoder including means responsive to said decoder reset signal for resetting the decoder at the beginning of each line and frame.

10. The system of claim 8 wherein said refresh means includes means for counting successive scan lines of each said frame and for generating a line select signal every Mth line where M is an integer having a fixed value that has no factors in common with S, said refresh means including means for counting said line select signals and for generating said refresh cycle synchronizing signal when the count reaches S.

11. The system of claim 8 wherein said refresh means includes means for selecting scan lines of different spatial positions in adjacent successive frames.

12. The system of claim 11 wherein said means for generating said synchronizing signals includes means for counting the number of scan lines selected by said refresh means and for generating said synchronizing signal when the count of said refreshed lines is S.

13. In a system for generating an information signal representating a plurality of contiguous frames of data, each frame containing S lines of data, each said lines of data occurring in certain time periods, said system including means for selecting one line at a time over a given refresh cycle of L frames such that each line of a frame is selected once in that given refresh cycle, means for synchronizing each said refresh cycle comprising:

means for counting said selected one line to generate a count signal manifesting the count of said S lines;

means responsive to said count signal applied as an input thereto for generating a refresh cycle synchronizing signal; and refresh means for refreshing said selected S lines such that selected refreshed lines in adjacent successive frames have different spatial positions, said selected S lines being refreshed over said refresh cycle comprising said L frames, said refresh means including means responsive to said synchronizing signal to reset said refresh means to start a new refresh cycle for each set of L frames.

14. The system of claim 13 wherein said refresh means includes means for generating a line select count signal having a value N and a divide by N counter responsive to said line select count signal for counting the value N of said line select count signal and for generating said line select signal upon completion of the divide by N count cycle where M is N+1 and M is an integer having no factors in common with S.

15. In a DPCM communication system including means for transmitting an encoded information signal to a receiver, said signal representing a video raster display comprising a plurality of successively occurring frames, each frame of a like plurality of S scan lines, the transmitted signal tending to exhibit errors which errors adversely affect the received signal, a refresh system for periodically generating an unencoded PCM information signal portion tending to overcome said adverse affect, said information signal portion corresponding to at least one scan line of a frame raster; said refresh system comprising:

transmitter refresh means for periodically causing said means for transmitting to generate and transmit said unencoded PCM information signal portion in response to a first transmitter refresh control signal applied thereto, a plurality of said portions comprising a frame, the selected signals comprising a complete frame over a refresh cycle of a plurality of frames;

count means at the transmitter for counting said first refresh control signal to generate a count signal manifesting the counts of said generated PCM information signal portions corresponding to a complete frame of a refresh cycle;

means for transmitting said encoded information signal, said unencoded PCM signal and a given signal manifesting said count signal;

receiver refresh means for periodically causing the receiver to process said received unencoded PCM information in response to a second receiver refresh control signal to refresh the prior received decoded information signal with PCM signals;

means for periodically generating said first and second control signals asynchronously at said transmitter and receiver; and means at the receiver responsive to said transmitted given signal applied thereto for periodically synchronizing the generation of said second refresh control signal to the first refresh control signal.

16. The refresh system of claim 15 wherein said DPCM system includes means for generating an error signal representing the difference between a current received information signal and a predicted information signal, said refresh means including means responsive to said first and second refresh control signals for nullifying said predicted refresh signal so that said current signal is unchanged, said refresh means including means for generating said first and second refresh control signal in time periods corresponding to every Mth scan line where M is an integer having no factors in common with S.

17. In a DPCM communication system including a transmitter for transmitting a plurality of frames of a compressed digital encoded information signal over a channel to a receiver, the transmitter including a DPCM loop which produces an error signal representing the differences between a predicted signal and a current PCM signal having the same spatial position in successive frames, each frame comprising a plurality of S lines, said receiver including a resettable decoder which searches for a new codeword when reset and an inverse DPCM loop for adding a current predicted signal, formed from a prior decoded error information signal, to a current decoded error information signal to produce a reconstituted signal, the signal in the inverse DPCM loop tending to become corrupted upon loss of the current decoded error information signal, the combination therewith comprising:

means at the transmitter and receiver for periodically resetting the decoder to search for and decode codewords at the beginning of each said lines and at the beginning of each said frames.

18. The system of claim 17 wherein said means for resetting includes means for generating first and second marker signals respectively manifesting the beginning of each said line and each said frame, said decoder including means responsive to said marker signals for initiating said resetting.

* * * * *